W. WEBER.
PLANT FOR SEPARATING COKE FROM WASTE FUEL AND RESIDUES.
APPLICATION FILED DEC. 27, 1920.

1,429,987. Patented Sept. 26, 1922.

Patented Sept. 26, 1922.

1,429,987

UNITED STATES PATENT OFFICE.

WILHELM WEBER, OF WIESBADEN, GERMANY, ASSIGNOR TO THE FIRM WEBER & CO. GESELLSCHAFT FÜR BERGBAU, INDUSTRIE UND BAHNBAU, OF WIESBADEN, GERMANY.

PLANT FOR SEPARATING COKE FROM WASTE FUEL AND RESIDUES.

Application filed December 27, 1920. Serial No. 433,471.

*To all whom it may concern:*

Be it known that I, WILHELM WEBER, a citizen of the German Republic, residing at Wiesbaden, Germany, have invented certain new and useful Improvements in Plants for Separating Coke from Waste Fuel and Residues (for which I have filed an application for patent in Germany on November 24, 1919), of which the following is a specification.

This invention relates to a plant for dressing in a special manner the waste fuel from gasworks, boilers and the like with a view to recuperate the fuel, mostly coke, contained in said waste.

Hitherto a settling machine has been used for this purpose with the auxiliary devices of the type employed for the dressing of coal. The settling machines retain however the waste coke during the separating period which takes place on the basis of the specific difference of weight between coke and slag for an excessively long time, so that the coke absorbs much water whereby the separation becomes incomplete. The efficiency of such plants is further limited always by the working of the settling machine.

This inconvenience is obviated by the present invention which makes the plant cheaper and improves the efficiency of the same.

In order that the invention may be clearly understood, I shall describe the same with reference to the example of construction shown in the accompanying drawings, wherein:—

Figure 1:
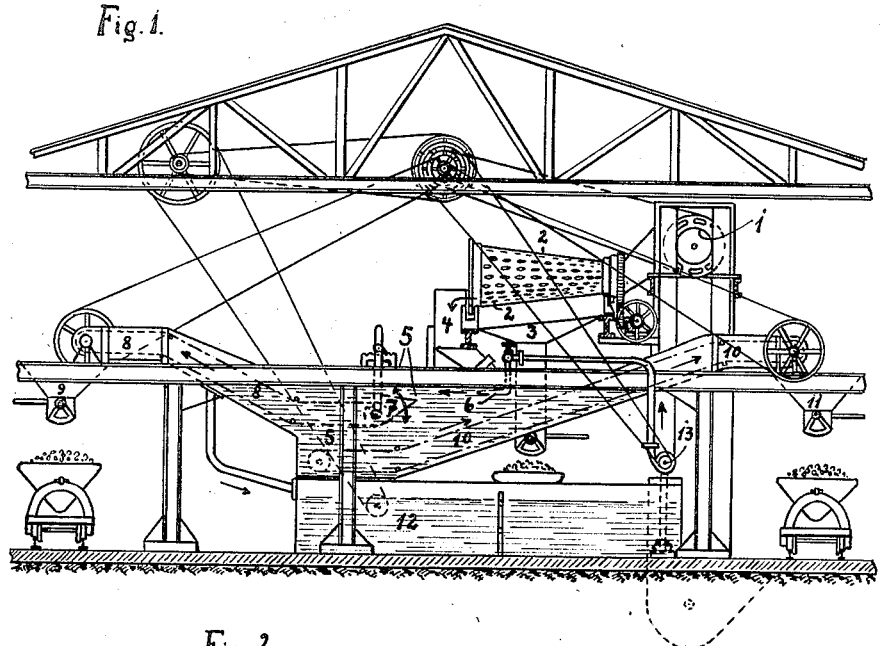
Figure 2:
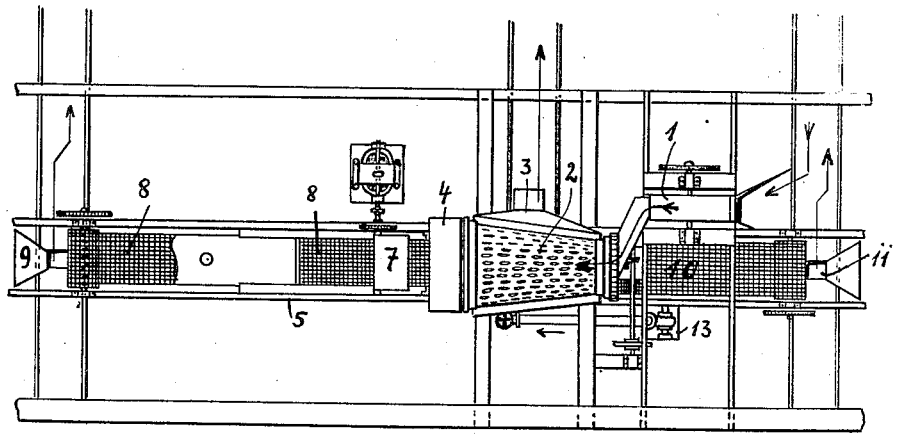
Figure 3:
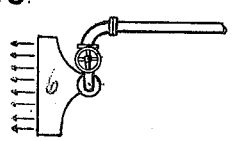

Fig. 1 is an elevation of the plant.
Fig. 2 is a plan view of Fig. 1.
Fig. 3 shows a detail of the device on a larger scale.

The plant consists of the automatic charging device 1 which feeds the waste containing 30% of fuel to the sifting drum 2. In the sifting drum 2 the fine ashes are sifted out which are removed by the chute 3. The remaining slag and coke drops from the sifting drum 2 upon a chute 4 which is adjustably inclined and designed to distribute the material slowly over the entire width of a water reservoir at a determined point of the same. The water reservoir 5 consists of a narrow trapesoidal box which is filled with water up to a determined height. In this reservoir the water is at rest, only upon the surface of the water a flow in determined direction is produced over the entire width of the box by means of water under pressure supplied by a nozzle 6 of special shape.

The material to be inserted is fed from the perforated drum 2 into this surface flow. It has to be remarked that with dry waste fuel the difference of the specific weights between slag and coke is still very considerable, as soon however as the material drops into the water the coke is quickly saturated with water and the separation becomes more difficult.

In the present case the coke dropping into the surface current is gripped by the current and carried along whilst the slag and other heavy parts sink through the surface current into the water of the reservoir. The sinking parts execute two determined curves of movement in a determined direction which diverge from the moment when they enter the water and remain in this curve for a short time. At the end of these curves of movement an adjustable trap 7 is arranged between the two curves. The trap 7 and the nozzle 6 are positioned the one with regard to the other in such a manner that the velocity of the surface current and the adjustment of the trap effect a correct separation of coke and slag. As coke owing to its low specific weight, remains longer in the current than the slag, it is conducted beyond the trap 7 directly upon an endless conveyor band 8 which conveys the coke to a bunker 9.

The conveyor band permits further to remove from the coke, slag which should have been carried along. The slag as the specifically heaviest material drops below the oscillating trap 7 into the water upon a conveyor band 10 which carries the same to a bunker 11 arranged at the end of the plant opposite to the bunker 9. Pieces of coke which could be admixed with the slag can be sorted and removed from the slag near the bunker 11. The water circulates and is clarified in receptacle 12 and circulated by means of a centrifugal pump 13.

The plant is of great efficiency and of simple construction.

I claim:—

A plant for separating coke from waste fuel and residues comprising in combination, a water receptacle, a chute for transporting material into said water receptacle a nozzle in said water receptacle for producing a surface current upon the water, an adjustable trap arranged at a certain distance in front of said chute and nozzle under the water, a conveyor band directly under the surface of the water and a conveyor band upon the bottom of the receptacle, the first for conveying the coke which has been taken along by the surface current, the second for conveying the slag and heavy admixtures which have sunk beneath said trap, a clarifying vessel for the water from the tank and a centrifugal pump for circulating said water through said plant.

In testimony whereof I affix my signature in presence of two witness.

WILHELM WEBER.

Witnesses:
WILHELM HIRSCHMANN,
WILHELM FELL.